United States Patent
Huang et al.

(10) Patent No.: US 9,135,942 B2
(45) Date of Patent: Sep. 15, 2015

(54) HEAT ASSISTED MAGNETIC RECORDING HEAD HAVING WIDER HEAT SINK AND POLE

(71) Applicant: HGST Netherlands B.V., Amsterdam (NL)

(72) Inventors: Lidu Huang, Danville, CA (US); Barry C. Stipe, San Jose, CA (US); Petrus A. Van Der Heijden, Cupertino, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/903,899

(22) Filed: May 28, 2013

(65) Prior Publication Data
US 2014/0355399 A1    Dec. 4, 2014

(51) Int. Cl.
*G11B 5/127* (2006.01)
*G11B 5/02* (2006.01)
*G11B 13/04* (2006.01)

(52) U.S. Cl.
CPC ....................................... *G11B 13/04* (2013.01)

(58) Field of Classification Search
CPC .............................. A01B 12/006; G11B 13/04
USPC ......... 360/59, 125.3, 125.31, 125.71, 125.74, 360/128
See application file for complete search history.

(56) References Cited

U.S. PATENT DOCUMENTS

| | | | |
|---|---|---|---|
| 7,880,996 | B2 | 2/2011 | Stipe |
| 8,102,625 | B2 | 1/2012 | Shiramatsu et al. |
| 8,149,657 | B2 | 4/2012 | Huang et al. |
| 8,164,855 | B1 | 4/2012 | Gibbons et al. |
| 2010/0214685 | A1 | 8/2010 | Seigler et al. |
| 2011/0128828 | A1 | 6/2011 | Naniwa et al. |
| 2011/0205863 | A1 | 8/2011 | Zhao et al. |
| 2011/0286127 | A1 | 11/2011 | Gao et al. |
| 2012/0039155 | A1 | 2/2012 | Peng et al. |
| 2012/0045662 | A1 | 2/2012 | Zou et al. |
| 2012/0050906 | A1 | 3/2012 | Balamane et al. |
| 2012/0218871 | A1 | 8/2012 | Balamane et al. |

*Primary Examiner* — Gustavo Polo
(74) *Attorney, Agent, or Firm* — Zilka-Kotab, PC

(57) ABSTRACT

In one embodiment, a system includes a magnetic head having a write portion having a main pole, a near field transducer comprising a conductive metal film having outer regions extending from an active region, and an optical waveguide for illumination of the near field transducer, wherein the conductive metal film extends in a cross track direction for a width at least 200% greater than a width of the active region of the conductive metal film, wherein a portion of the main pole extends along the conductive metal film in a cross track direction for a width at least 200% greater than the width of the active region of the conductive metal film.

24 Claims, 8 Drawing Sheets

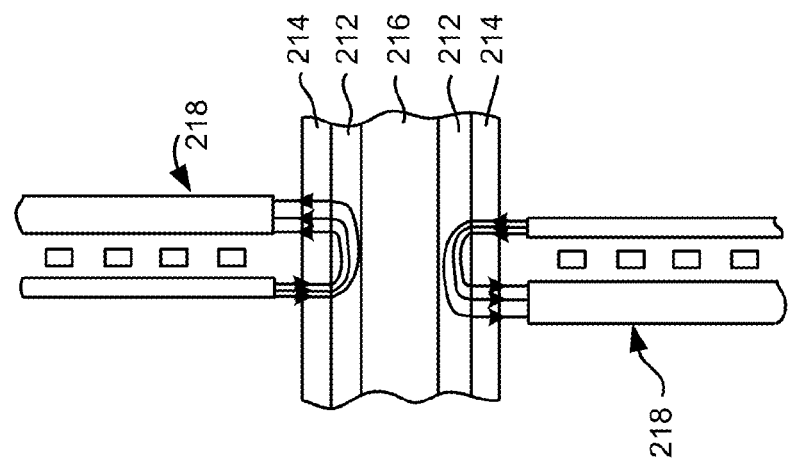
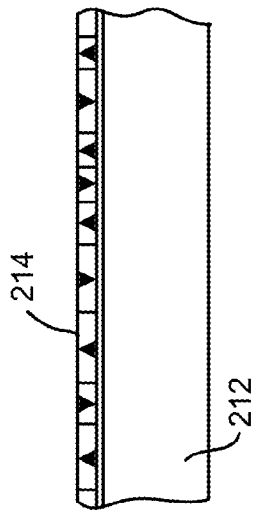
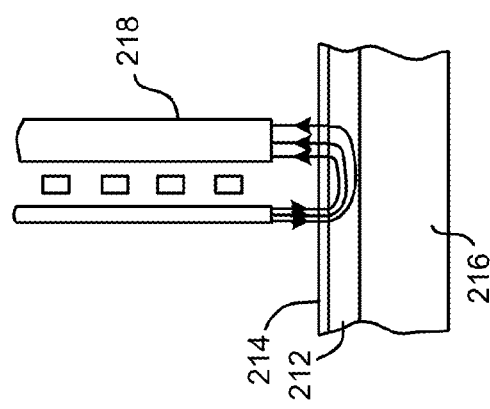
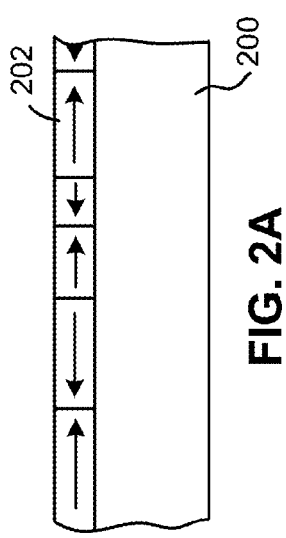
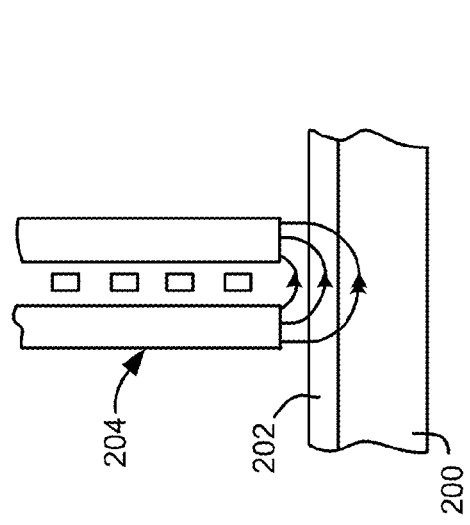

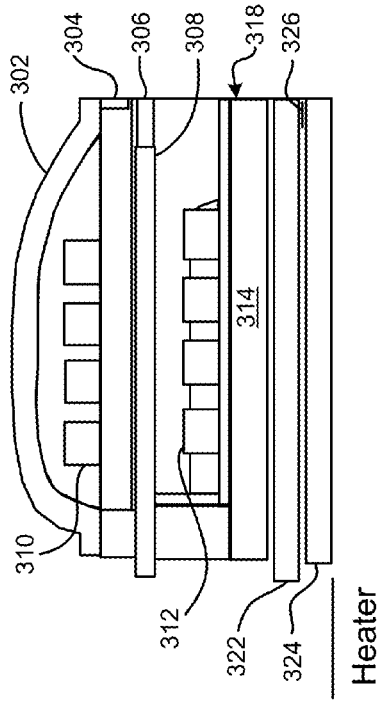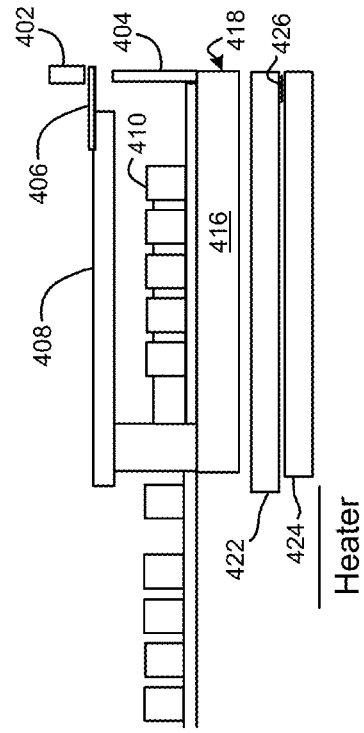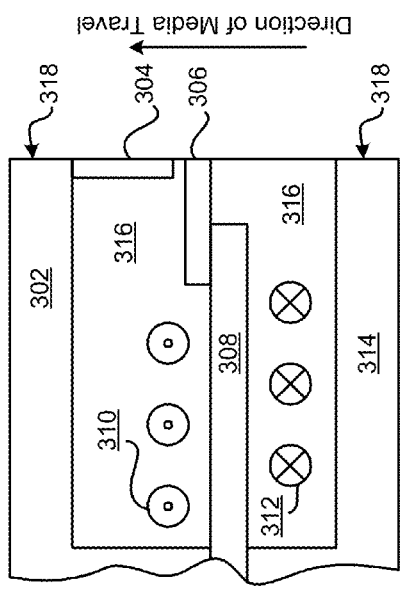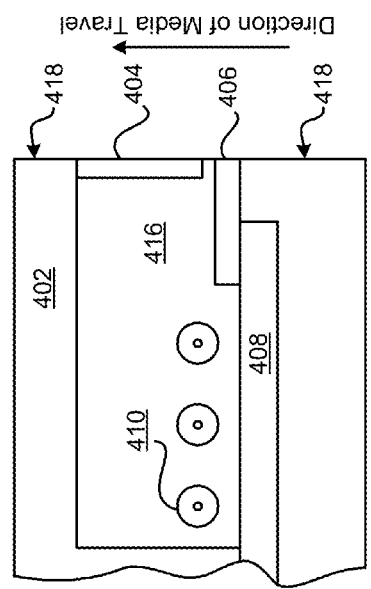

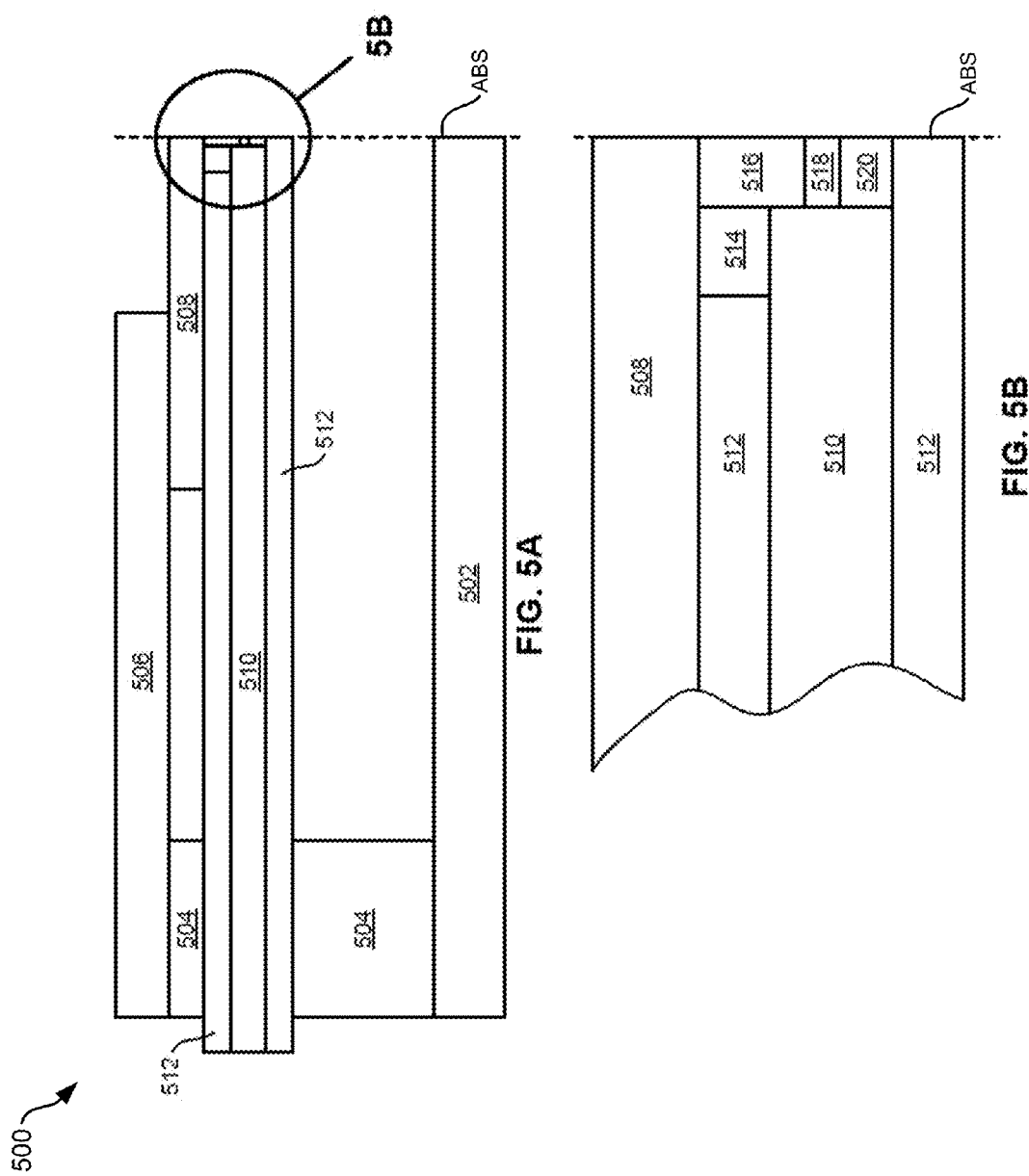

HEAT ASSISTED MAGNETIC RECORDING HEAD HAVING WIDER HEAT SINK AND POLE

FIELD OF THE INVENTION

The present invention relates to data storage systems, and more particularly, this invention relates to heat assisted recording heads which have a wider heat sink and/or main pole.

BACKGROUND

A magnetic hard disk drive (HDD) includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into near contact with the surface of the disk, whereby air is swirled by the rotating disk adjacent an air bearing surface (ABS) of the slider, causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD.

The ongoing quest for higher storage bit densities in magnetic media used in disk drives have reduced the size (volume) of data cells to the point where the cell dimensions are limited by the grain size of the magnetic material. Although grain size can be reduced further, there is concern that data stored within the cells is no longer thermally stable, as random thermal fluctuations at ambient temperatures are sufficient to erase data. This state is described as the superparamagnetic limit, which determines the maximum theoretical storage density for a given magnetic media. This limit may be raised by increasing the coercivity of the magnetic media or lowering the temperature. Lowering the temperature is not a practical option when designing hard disk drives for commercial and consumer use. Raising the coercivity is a practical solution, but requires write heads employing higher magnetic moment materials, or techniques such as perpendicular recording (or both).

One additional solution has been proposed, which employs heat to lower the effective coercivity of a localized region on the magnetic media surface and writes data within this heated region. The data state becomes "fixed" upon cooling the media to ambient temperatures. This technique is broadly referred to as "heat assisted (magnetic) recording", HAMR, or "thermally assisted magnetic recording" TAR or TAMR. It can be applied to both longitudinal or perpendicular recording systems, although the highest density state of the art storage systems are more likely to be perpendicular recording systems. Heating of the media surface has been accomplished by a number of techniques such as focused laser beams or near field optical sources.

Although thermally assisted recording allows for a more precise recording to media, operating temperatures can rise high enough to compromise head functionality if left unmanaged. Peak temperatures in TAR media can reach over 800° C. during normal operation of heating media while writing data thereto, e.g., to reach the media's Curie temperature. Moreover, HAMR heads having inadequate heat sinking capabilities may also reach temperatures of several hundred degrees. Thus, thermal management is an important factor for TAR heads and is one of the gating issues for head reliability. Without thermal management, serious damage to the head and/or magnetic medium may result, such as metal diffusion on the TAR head, thermal degradation, etc.

SUMMARY

In one embodiment, a system includes a magnetic head having a write portion having a main pole, a near field transducer comprising a conductive metal film having outer regions extending from an active region, and an optical waveguide for illumination of the near field transducer, wherein the conductive metal film extends in a cross track direction for a width at least 200% greater than a width of the active region of the conductive metal film, wherein a portion of the main pole extends along the conductive metal film in a cross track direction for a width at least 200% greater than the width of the active region of the conductive metal film.

In another embodiment, a system includes a magnetic head having a write portion having a main pole and a return pole, a near field transducer comprising a conductive metal film having an active region, the active region having a main body and a ridge extending from the main body; and outer regions extending from the active region; an optical waveguide for illumination of the near field transducer, wherein each outer region has a width in a cross track direction that is at least 100% greater than a width of the active region in the cross track direction.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

FIG. 5A is a partial cross section view of a thin film perpendicular write head design according to one embodiment.

FIG. 5B is a partial cross section expanded view of detail 5B in FIG. 5A, in accordance with one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a system includes a magnetic head having a write portion having a main pole, a near field transducer comprising a conductive metal film having outer regions extending from an active region, and an optical waveguide for illumination of the near field transducer, wherein the conductive metal film extends in a cross track direction for a width at least 200% greater than a width of the active region of the conductive metal film, wherein a portion of the main pole extends along the conductive metal film in a cross track direction for a width at least 200% greater than the width of the active region of the conductive metal film.

In another general embodiment, a system includes a magnetic head having a write portion having a main pole and a return pole, a near field transducer comprising a conductive metal film having an active region, the active region having a main body and a ridge extending from the main body; and outer regions extending from the active region; an optical waveguide for illumination of the near field transducer, wherein each outer region has a width in a cross track direction that is at least 100% greater than a width of the active region in the cross track direction.

Figure 1:
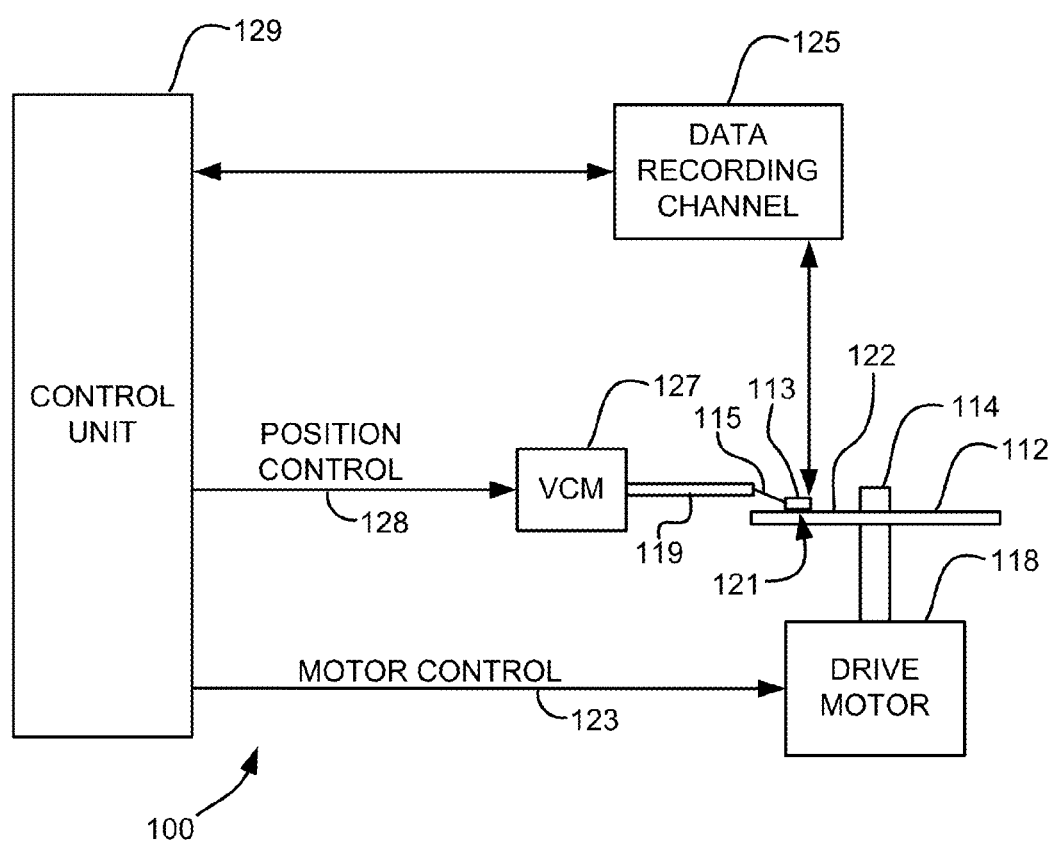
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic medium (e.g., magnetic disk 112) is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Magnetic heads, such as those listed above, may be used in conjunction with TAR. However, as described above, peak temperature in TAR heads can reach over 800° C. during normal operation. Thus, thermal management is an important factor for TAR heads. Without thermal management, damage to the head and/or magnetic medium may result, such as metal diffusion on the TAR head.

To alleviate this problem, various embodiments described and/or suggested herein preferably provide an improved TAR head heat sink design, which reduces head peak temperature. Preferably, the different approaches described and/or suggested herein may reduce head peak temperature by up to about 10%, more preferably up to about 20%, still more preferably up to about 25%, compared to an otherwise identical head without the novel features discussed herein, as will be discussed in further detail below.

Now referring to FIG. 5A, a partial cross section view of a system 500 having a thin film perpendicular write head design incorporating an integrated aperture near field optical source (e.g., for TAR operation) is shown according to one embodiment. Of course, this embodiment may be used in conjunction with any structures and systems described in any of the other figures. In order to simplify and clarify the structures presented, spacing layers, insulating layers, and write coil layers may be omitted from the subsequent figures and descriptions.

With continued reference to FIG. 5A, the write head has a lower return pole layer 502, back-gap layer(s) 504, upper return pole layer 506, and upper pole tip layer 508. In one approach, the lower return pole layer 502 may also have a lower pole tip (not shown) at the ABS. Layer 510 is an optical waveguide core, which may be used while conducting TAR, e.g., to heat a medium (not shown) at the ABS when the system 500 is writing thereto. According to a preferred approach, the optical waveguide core is surrounded by cladding layers 512. Moreover, layers 510 and 512 may extend through at least a portion of back-gap layer(s) 504. The components inside of Circle 5B are shown in an expanded view in FIG. 5B, as discussed in further detail below.

Layer 510 may be comprised of a suitable light transmitting material, as would be known by one of reasonable skill in the relevant art. Exemplary materials preferably include $Ta_2O_5$, and/or $TiO_2$. As shown, the core layer 510 has approximately uniform cross section along its length. As well known in the art, the optical waveguide can have a number of other possible designs including a planar solid immersion mirror or planar solid immersion lens which have a non-uniform core cross section along the waveguide's length.

In various approaches, coil layers (not shown) and various insulating and spacer layers (not shown) might reside in the cavity bounded by the ABS, back-gap(s) 504, lower return pole 502, and/or upper bounding layers 506, 508, and 512 as would be recognized by those of skill in the art. Layers 502, 504, 506, and 508 may be comprised of a suitable magnetic alloy or material, as would be known by one of reasonable skill in the relevant art. Exemplary materials include Co, Ni, and/or Fe and combinations thereof.

As described above, FIG. 5B is a partial cross section expanded view of detail 5B in FIG. 5A, in accordance with one embodiment. Pole lip 516 is magnetically coupled to upper pole tip layer 508, and to optional magnetic step layer 514. Aperture 518 (also known as a ridge aperture), surrounding metal layer 520, and pole lip 516 comprise the near field aperture optical source (or near field transducer), which is supplied optical energy via optical waveguide core 510. Pole lip 516 and optional magnetic step layer 514 may be comprised of a suitable magnetic alloy, such as Co, Fe, Ni, and/or combinations thereof. Metal layer 520 may be comprised of Cu, Au, Ag, and/or alloys thereof, etc.

With continued reference to FIG. 5B, cladding layer 512 thickness may be nominally about 200 nm, but may be thicker or thinner depending on the dimensions of other layers in the structure. Optional magnetic step layer 514 may have a nominal thickness (the dimension between layers 508 and 510) of about 150 nm, and a nominal depth (as measured from layer 516 to layer 512) of about 180 nm. Pole lip 516 may have a nominal depth (as measured from the ABS) approximately equal to that of layer 520, with the value being determined by the performance and properties of the near field optical source (see examples below). The thickness of the pole lip 516 can vary from about 150 nm (with the optional magnetic step layer 514) to about 1 micron, preferably between about 250 nm and about 350 nm. The thickness of optical waveguide core layer 510 may be nominally between about 200 nm and about 400 nm, sufficient to cover the thickness of the aperture 518.

As described above, thermal management is an important factor for TAR heads, as high operating temperatures in TAR heads can lead to serious damage thereto. Thus, various embodiments described and/or suggested herein preferably include an improved heat sink design which may reduce the head peak temperature of TAR heads. As a result, according to various approaches, the NFT peak temperature can effectively be reduced, thereby improving head reliability significantly. Moreover, approaches described and/or suggested herein may also allow for a narrower main pole lip in addition to a wider step, thereby improving performance of the system.

FIGS. 6A-7B depict a system 600 for reducing TAR head peak operating temperatures, in accordance with one embodiment. As an option, the present system 600 may be implemented in conjunction with features from any other embodiment listed herein, such as those described with reference to the other FIGS. Of course, however, such system 600 and others presented herein may be used in various applications and/or in permutations which may or may not be specifically described in the illustrative embodiments listed herein. Further, the system 600 presented herein may be used in any desired environment. Thus FIGS. 6A-7B (and the other FIGS.) should be deemed to include any and all possible permutations.

Referring now to FIGS. 6A-7B, the system 600 includes a magnetic head 602. As illustrated, the magnetic head 602 includes a write portion having a main pole 606 and a near field transducer. According to various approaches, the near field transducer of FIGS. 6A-7B may include the same or similar approaches as 516, 518, 520 of FIG. 5. Moreover, although not shown, the magnetic head 602 may also include a return pole (e.g., see FIGS. 3A-4B).

With continued reference to FIGS. 6A-7B, the near field transducer includes an electrically conductive metal film 608 having outer regions 610 extending from an active region 612. The active region 612 of the conductive metal film 608 is generally defined as the portion thereof that is illuminated by light from the waveguide 616 as will soon become apparent, but is not limited thereto. According to various approaches, the conductive metal film 608 may include ruthenium, gold, rhodium, chrome, gold-copper alloy, etc., or any other conductive material suitable for use as a near field transducer, which would be apparent to one skilled in the art upon reading the present description. In a preferred approach, the conductive metal film 608 is nonmagnetic, e.g., to prevent from affecting the magnetic recording of the head 602, but is not limited thereto.

The system 600 additionally includes an optical waveguide 616 and cladding layers 615 for illumination of the near field transducer, e.g., to enable TAR performance. According to different approaches, the optical waveguide 616 may include any of the materials and/or configurations described above with reference to layer 510 of FIG. 5. Moreover, cladding layers 615 may incorporate any of the approaches described above with reference to 512 of FIGS. 5A-5B.

Referring again to FIGS. 6A-7B, the thickness t of the conductive metal film 608, in the in-track direction Y, may have a value in a range from less than the width of the waveguide in the same direction, to greater than the width of the waveguide and cladding. Thus, in various approaches, the waveguide 616, cladding layers 615 and/or conductive metal film 608 may have a thickness in the in-track direction Y from about 0.35 μm to about 0.65 μm, but may be higher or lower depending on the desired embodiment.

According to one approach, the light guiding core of the optical waveguide 616 may be directly coupled to the near field transducer (e.g., having physical contact therebetween). However, in another approach, the light guiding core of the optical waveguide 616 may be spaced from the near field transducer in a height direction, e.g., perpendicular to the media facing surface thereof, by a spacer 614. According to different approaches, the optical waveguide may be spaced from the near field transducer by greater than 0 nanometers and less than about 100 nanometers, more preferably greater than 0 nanometers and less than about 20 nanometers, but may be higher depending on the desired embodiment. According to one approach, which is in no way intended to limit the invention, the dimensions of the spacer 614 may depend, at least in part, on the design of the active region of the conductive metal film 608.

According to some embodiments, to effectively implement TAR, it may be beneficial to confine the heat applied to the medium to about a single data track. Thus, according to one approach a ridge may be used to focus heating to a single track. In a preferred approach, the active region 612 of the conductive metal film 608 may have a main body and a ridge extending from the main body. Thus, according to one approach, the near field transducer may include a ridge 622 extending from the conductive metal film 608 in the active region 612 thereof. Depending on the desired embodiment, the ridge 622 may be formed by incorporating different designs. In one approach, the conductive metal film may have a C aperture formed therein. However, according to another approach, the conductive metal film may have an E shape.

According to various approaches, the size and/or shape of the ridge may be tunable based on the desired performance thereof. Moreover, the conductive metal film designs incorporating a ridge as mentioned above, in addition to other exemplary embodiments thereof, are described in further detail in U.S. patent application Ser. No. 13/438,811, which is herein incorporated by reference.

Referring still to FIGS. 6A-7B, the conductive metal film 608 extends in a cross track direction X for a total width $W_1$. Preferably the width $W_1$ extends much wider than the width $W_2$ of the active region 612 such that the heat generated therein is directed away e.g., towards the outer regions, and preferably absorbed by the main pole 606 therealong. Thus, according to one approach, the total width $W_1$ of the conductive metal film 608 may extend at least 200% greater than a width $W_2$ of the active region 612 of the conductive metal film 608, more preferably greater than 400% thereof, even more preferably greater than 500% thereof. According to another approach, each outer region 610 may have a width in a cross track direction that is at least 100% greater than the width $W_2$ of the active region 612 in the cross track direction X, preferably greater than 200% thereof, more preferably greater than 250% thereof.

Preferably, the conductive metal film 608 may have a total width $W_1$ from about 1 µm to about 10 µm, preferably about 1.5 µm to about 5 µm. In one illustrative embodiment, the total width $W_1$ may be about 3 µm.

Figure 6A:
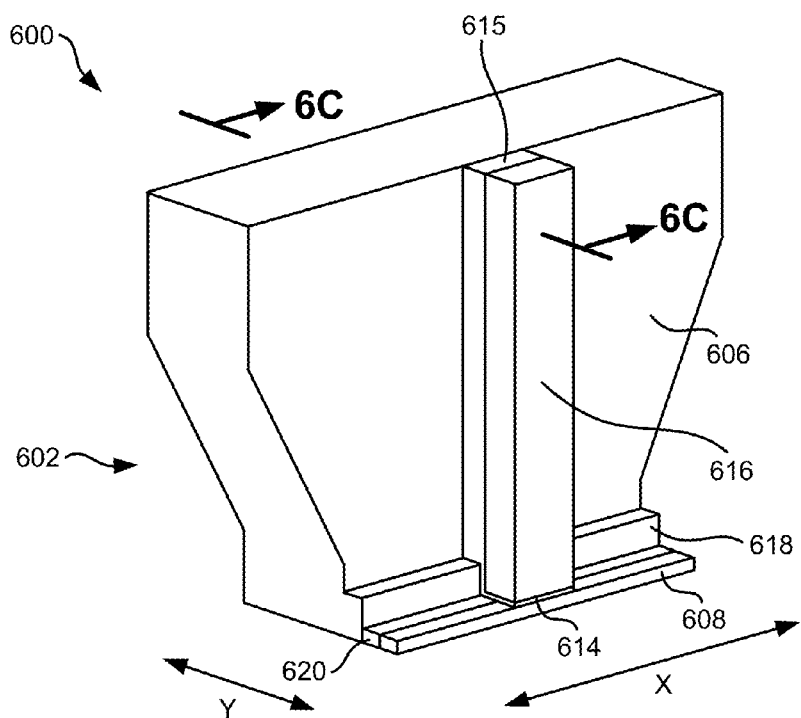
FIG. 6A is a partial perspective view of a magnetic head design according to one embodiment.
Figure 6B:
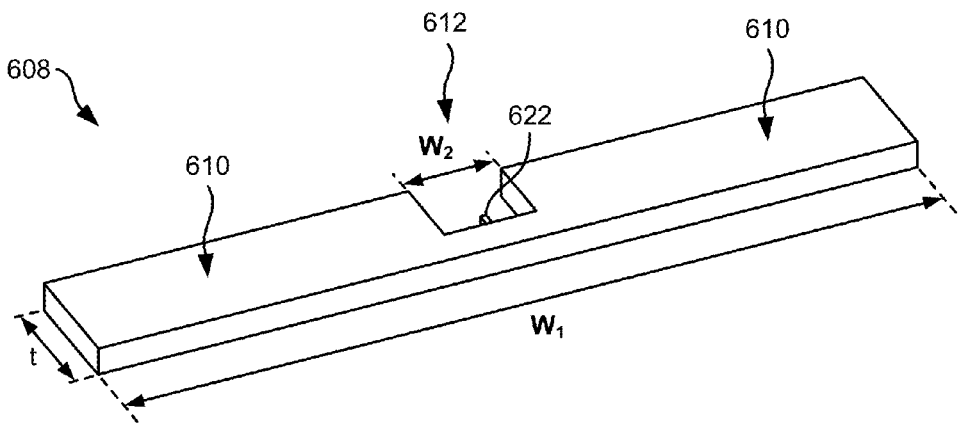
FIG. 6B is an expanded perspective view of the conductive metal film in FIG. 6A, in accordance with one embodiment.
Figure 6C:
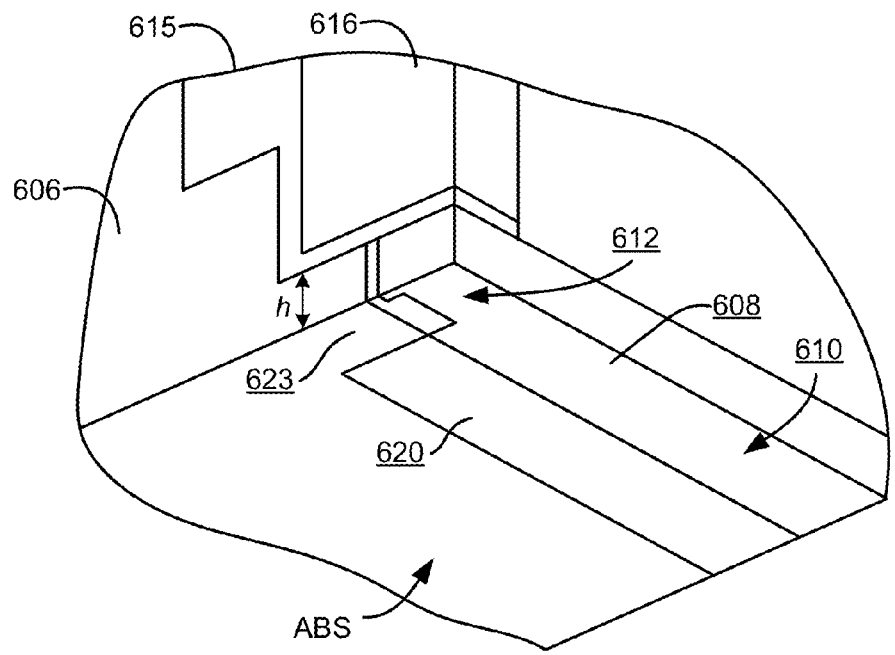
FIG. 6C is a partial cross sectional ABS views of the magnetic head of FIG. 6A taken along plane 6C from FIG. 6A.
Figure 6D:
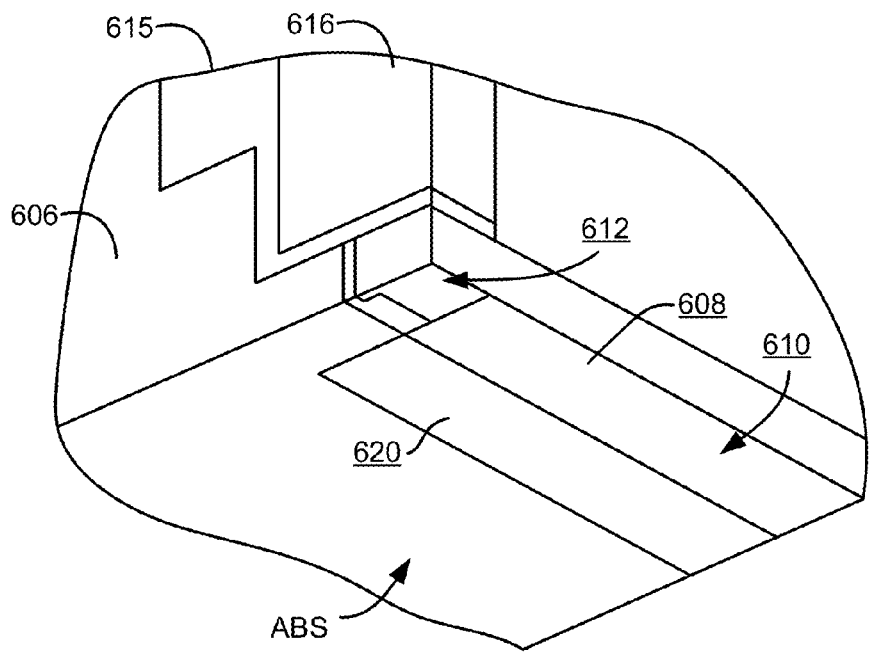
FIG. 6D is an alternate embodiment of the magnetic head of FIG. 6C.

FIGS. 6C and 6D depict partial cross sectional ABS views of the head of FIG. 6A, and an alternate embodiment. As shown, the active portion 612 and the outer regions 610 of the conductive metal film may have the same composition, as shown in FIG. 6C, or may have different compositions as shown in FIG. 6D. In such case, the outer regions 610 are preferably formed of a nonmagnetic metal (or other material) having a high thermal conductivity, e.g., comparable to the thermal conductivity of the pole 606. Illustrative materials for the outer regions include chromium, aluminum, ruthenium, rhodium, gold, copper, etc.

Figure 8:
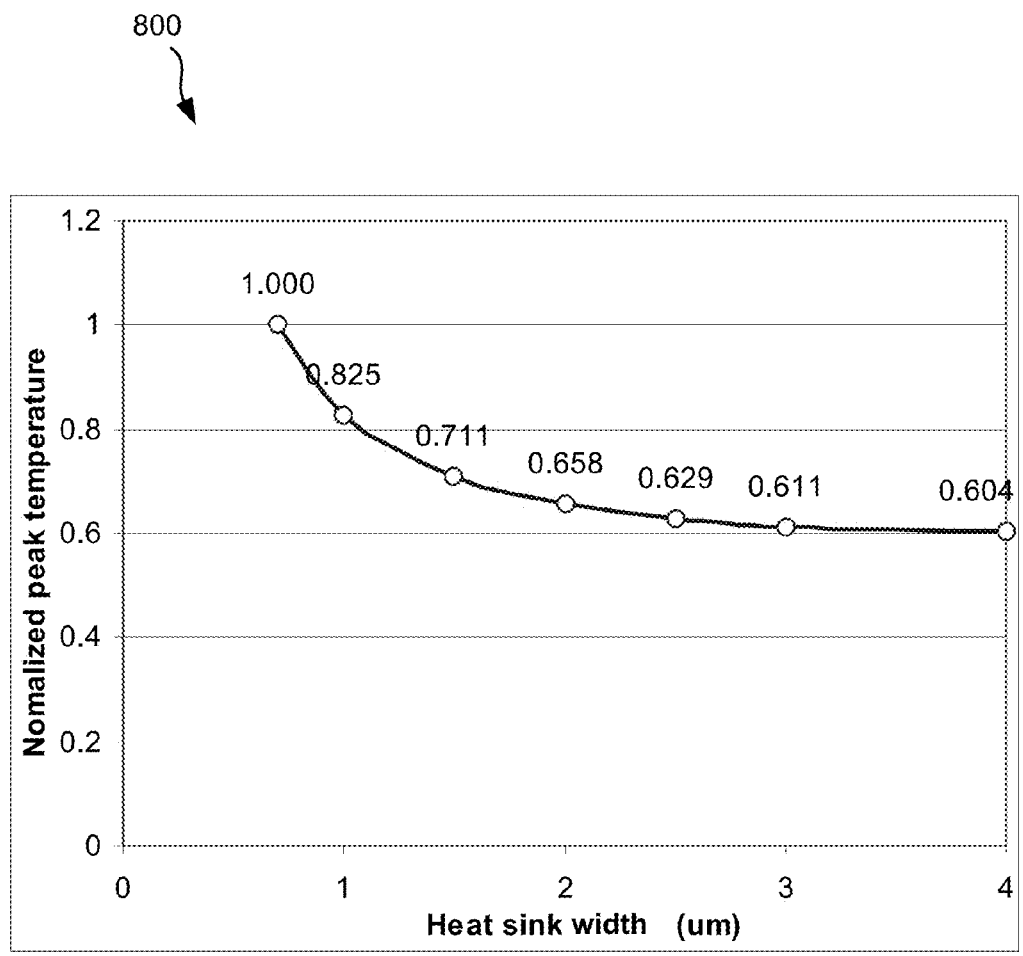
FIG. 8 is a graph illustrating the relationship between peak temperatures and main pole dimensions for a magnetic head design according to one embodiment.

FIG. 8 depicts a graphical representation formed by the inventors through modeling of the head design illustrated in FIGS. 6A-6B. The graph 800 illustrates the relationship between peak operating temperatures corresponding to different widths of the main pole in a cross track direction at a media-facing surface (X direction in FIG. 6A). Moreover, as noted on the graph 800, the lip thickness in the Y direction of the head used in the testing was 280 nm. The inventors found that by increasing the width of the main pole (e.g., heat sink) as described in the various approaches herein, the peak temperature of the TAR head desirably decreases. After testing a wide range of widths for the main pole, the inventors discovered that the peak temperature drops very little for main pole widths larger than about 3 µm. Thus, without wishing to be bound by any theory, the inventors believe the optimal width of the main pole to be about 3 µm, for the design tested.

Referring again to FIGS. 6A-7B, the width $W_1$ of the conductive metal film 608 is preferably about the same as the width of the portion of the main pole 606 at a media-facing surface (e.g., an air bearing surface (ABS)) of the portion of the main pole 606. Moreover, in a similar approach the distance between outer ends of the outer regions 610 may be about as wide as a width of a portion of the main pole 606 at a media-facing surface of the portion of the main pole 606. Thus, the wider main pole 606 may absorb a maximized amount of the heat carried by the conductive metal film 608 along the width of $W_1$.

In other embodiments, the width $W_1$ of the conductive metal film 608 may be greater than, or less than, the width of the portion of the main pole 606 at the media-facing surface.

In a further approach, the portion of the main pole 606 (e.g., at a media facing surface) may extend along the conductive metal film 608 in a cross track direction X for a width at least 200% greater than the width $W_2$ of the active region 612 of the conductive metal film 608.

According to another approach, the width of the portion of the main pole 606 is preferably about the same as or greater than a track width. According to the present description, the track width can be generally defined as an average width of a track of data as written by the head to a continuous (as opposed to patterned) magnetic medium in the cross track direction X, prior to any shingling.

Figure 7A:
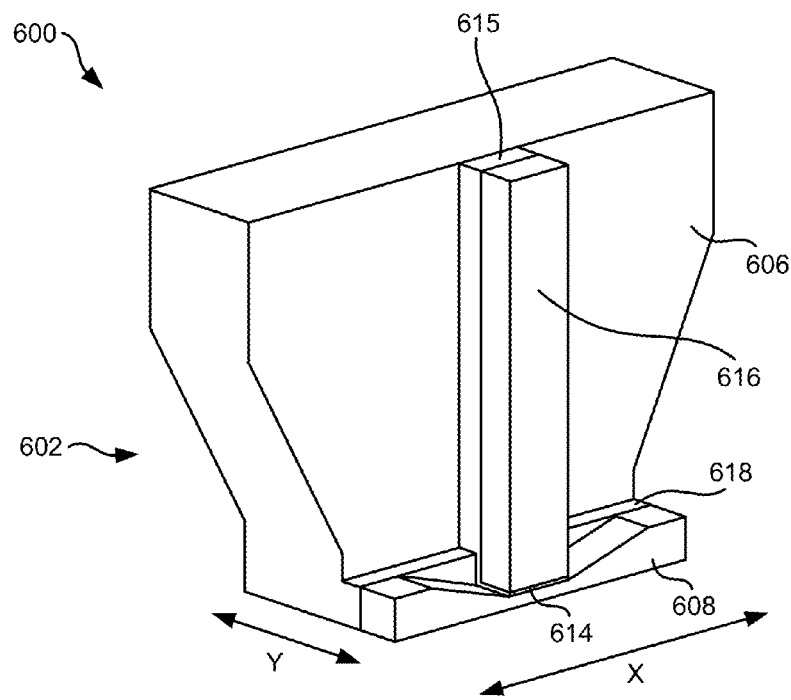
FIG. 7A is a partial perspective view of a magnetic head design according to one embodiment.
Figure 7B:
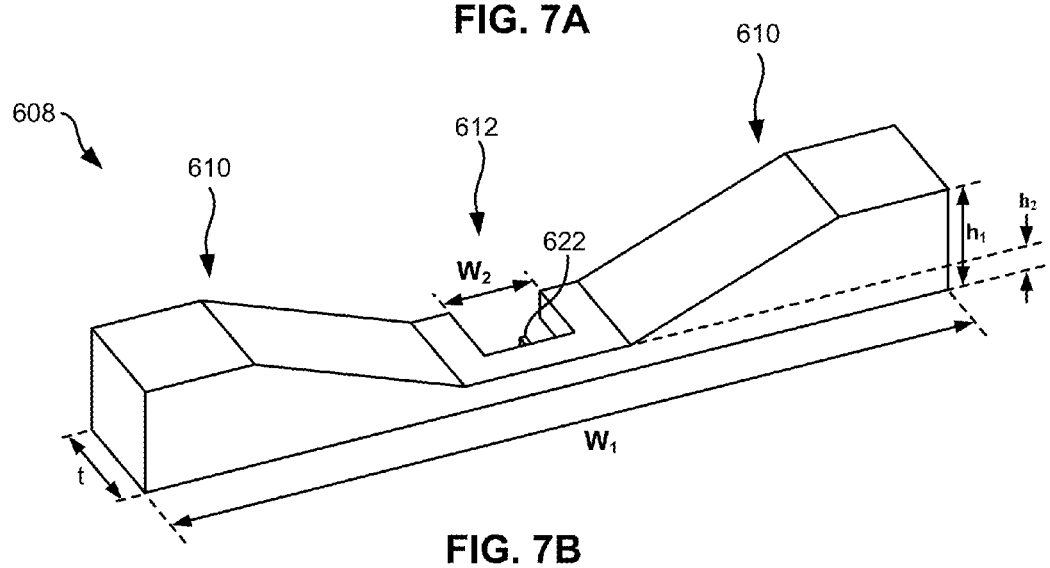
FIG. 7B is an expanded perspective view of the conductive metal film in FIG. 6A, in accordance with one embodiment.

Looking now to FIGS. 7A-7B, according to one approach, the height $h_1$ of at least one part of the outer regions 610 may be greater than a height $h_2$ of the active region 612. As illustrated, the heights $h_1$, $h_2$ are measured in a direction perpendicular to a media facing side of the conductive metal film 608.

According to one approach, the height of at least a portion of the outer regions may increase therealong away from the active region. For example, as illustrated in FIGS. 7A-7B, the height of the conductive metal film increases away from the active region, thereby creating a tapered (e.g., flared) shape. Furthermore, according to various other approaches, the height of the conductive metal film 608 may increase in a stepped fashion, a curved shape, etc., depending on the desired embodiment.

However, in yet another approach, the height of the conductive metal film 608 may be about uniform from the active region 612 spanning through the outer regions 610 (e.g., see FIG. 6B). According to different instances, the height of a uniform conductive metal film 608 from the active region 612 spanning through the outer regions 610 may be from about 30 nm to about 200 nm, but may be higher or lower depending on the desired embodiment. According to various approaches, the height of the conductive metal film 608 may vary depending on the materials used therein, design of the system, fabrication methods, etc.

The increased height of the outer regions 610 preferably allows for more area for heat transfer between the conductive metal film 608 and the main pole 606, thereby further increasing the amount of heat transferred therebetween and absorbed by the main pole 606. The inventors have discovered through further modeling that the peak operating temperatures may be reduced by 31° C., in the examples modeled, by incorporating a conductive metal film having tapered outer regions, relative to a model where the conductive metal film has an about uniform height. Modeling also showed that the peak operating temperatures may be reduced by 98° C., in the examples modeled, by incorporating a conductive metal film having tapered outer regions, relative to a model where the heat sink is not extended in the cross track direction. This reduction in peak operating temperature desirably elongates TAR head life expectancies, by at least reducing thermal degradation thereof.

With continued reference to FIGS. 6A-7B, the main pole 606 of the write portion may have a step 618 extending towards the conductive metal film 608 of the near field transducer in an in-track direction Y. According to various approaches, the step 618 may have a thickness in the in-track direction Y from about 0.10 to about 0.25, but may be higher or lower, depending on the desired embodiment.

Moreover, according to a preferred approach, the step 618 is shown in FIGS. 6A and 7A extending from the portion of the main pole 606, e.g., at about the media-facing surface. Thus, the outer regions 610 of the conductive metal film 608 preferably extend along the step 618 as illustrated. The step 618 may be part of the main pole 606, or a layer formed separately therefrom.

Although in a preferred approach the conductive metal film may be in direct contact with the main pole as in FIG. 7A, a secondary heat sink layer 620 may extend from the main pole 606 of the write portion, towards the conductive metal film 608, e.g., spanning to the outer regions 610. See FIG. 6A. Thus, according to one approach, if the main pole 606 has a step 618, the secondary heat sink layer 620 may be positioned between the conductive metal film 608 and the step 618, and extend laterally from the main pole lip 623, shown in FIG. 6C. In a preferred approach, the secondary heat sink layer 620 may have about the same height(s) (e.g., shape or profile) as the conductive metal film 608. It follows that, according to one approach, if the height $h_1$ of the outer regions 610 is greater than the height $h_2$ of the active region 612, the height of portions of the secondary heat sink layer 620 extending along the outer regions 610 is preferably greater than a height of the secondary heat sink layer 620 adjacent the active region 612 as well; where as described above, the heights are measured in a direction perpendicular to a media facing side of the conductive metal film.

In a preferred approach, the height of the secondary heat sink layer 620 may be about the same as the height of the conductive metal film 608 extending therealong. According to one approach, the maximum height of the outer regions of the conductive metal film may be as high as the lip 623, and preferably have a height that is equal to the height of the lip ±25% of a height h of the lip (i.e., 75% to 125% of the height of the lip 623, see FIG. 6C), but could be higher or lower depending on the desired embodiment. Moreover, according to another approach, the maximum height of the portions of the secondary heat sink layer 620 extending along the outer regions may be as high as the step, and preferably have a height that is equal to the height of the step ±25% of a height of the step (i.e., 75% to 125% of the height of the step), but could be higher or lower depending on the desired embodiment. Thus, according to an illustrative approach, which is in no way intended to limit the invention, the outer regions of the conductive metal layer may be about the same height as the lip 623, secondary heat sink layer 620 and/or the step extending along the outer regions thereof.

Furthermore, according to different approaches, the lip 620 and/or secondary heat sink layer 620 may have a thickness in the in-track direction Y from about 0.16 to about 0.175, but may be higher or lower depending on the desired embodiment.

Illustrative materials from which the secondary heat sink layer 620 may be formed include nonmagnetic metals (or other material) having a high thermal conductivity, e.g., comparable to the thermal conductivity of the pole 606. Illustrative materials for the outer regions include chromium, aluminum, ruthenium, rhodium, gold, copper, etc.

According to an exemplary approach which is in no way intended to limit the invention, the outer regions 610 may be formed as a continuous layer with the active region 612, e.g., the outer regions 610 may be part of the conductive metal film 608. However, it should be noted that the conductive metal film 608 may be formed using various layers, and may not necessarily be a unitarily-formed film. Thus, according to different approaches, the active region 612 and outer regions 610 may be constructed of the same or different materials, and/or in a separate manufacturing step depending on the desired embodiment. Moreover, according to an exemplary approach, which is in no way intended to limit the invention, the outer regions 610 and parts of the active region 612 of the conductive metal film 608 may be formed in a single step. However, in other approaches, the outer regions 610 may be formed in a separate step, and optionally of different material than a main body of the active region 612.

As described in the various approaches above, the large mass of the main pole acts as an effective thermal conductor for the magnetic head. This significant reduction in the peak operating temperature desirably lengthens the expected life of the embodiments described and/or suggested herein from that of conventional products, thereby favorably reducing system upkeep and operating costs.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
    a magnetic head having:
        a write portion having a main pole,
        a near field transducer comprising a conductive metal film having outer regions extending from an active region, and
        an optical waveguide for illumination of the near field transducer,
    wherein the conductive metal film extends in a cross track direction for a width ($w_1$) at least 200% greater than a width ($w_2$) of the active region of the conductive metal film,
    wherein a portion of the main pole extends along the conductive metal film in a cross track direction for a width at least 200% greater than the width ($w_2$) of the active region of the conductive metal film.

2. The system as recited in claim 1, wherein the width (($w_1$) of the conductive metal film is about the same as the width of the portion of the main pole at a media-facing surface of the portion of the main pole.

3. The system as recited in claim 1, wherein a height of the outer regions is greater than a height of the active region, the heights being measured in a direction perpendicular to a media facing side of the conductive metal film.

4. The system as recited in claim 3, wherein the height of at least a portion of the outer regions increases therealong away from the active region.

5. The system as recited in claim 1, wherein the conductive metal film has a ridge.

6. The system as recited in claim 1, wherein the conductive metal film has at least one of a C aperture formed therein, and an E shape.

7. The system as recited in claim 1, wherein a composition of the active region of the conductive metal film is different than the outer regions.

8. The system as recited in claim 1, wherein the main pole of the write portion has a step extending towards the conductive metal film of the near field transducer in an in-track direction, the outer regions extending along the step.

9. The system as recited in claim 1, wherein a light guiding core of the optical waveguide is spaced from the near field transducer by less than about 20 nanometers and greater than 0 nanometers.

10. The system as recited in claim 1, further comprising a secondary heat sink layer extending from the main pole of the write portion towards the conductive metal film, wherein a height of the outer regions is greater than a height of the active region, wherein a height of portions of the secondary heat sink layer extending along the outer regions is greater than a height of the secondary heat sink layer adjacent the active region, the heights being measured in a direction perpendicular to a media facing side of the conductive metal film.

11. The system as recited in claim 10, wherein a maximum height of the outer regions of the conductive metal film is equal to a height of a lip of the main pole ±25% of the height of the lip.

12. The system as recited in claim 10, wherein the main pole of the write portion has a step extending towards the conductive metal film of the near field transducer in an in-track direction, the secondary heat sink layer extending along the step, wherein a maximum height of the portions of the secondary heat sink layer extending along the outer regions is equal to a height of the step ±25% of the height of the step.

13. A magnetic data storage system, comprising:
at least one magnetic head as recited in claim 1;
a magnetic medium;
a drive mechanism for passing the magnetic medium over the at least one magnetic head; and
a controller electrically coupled to the at least one magnetic head for controlling operation of the at least one magnetic head.

14. A system, comprising:
a magnetic head having:
a write portion having a main pole and a return pole,
a near field transducer comprising a conductive metal film having an active region, the active region having a main body and a ridge extending from the main body; and
outer regions extending from the active region;
an optical waveguide for illumination of the near field transducer,
wherein each outer region has a width in a cross track direction that is at least 100% greater than a width of the active region in the cross track direction.

15. The system as recited in claim 14, wherein a distance between outer ends of the outer regions is about as wide as a width of a portion of the main pole of the write portion, along a media-facing surface of the portion of the main pole.

16. The system as recited in claim 14, wherein a height of the outer regions is greater than a height of the active region, the heights being measured in a direction perpendicular to a media facing side of the conductive metal film.

17. The system as recited in claim 16, wherein the height of at least a portion of the outer regions increases therealong away from the active region.

18. The system as recited in claim 14, wherein the conductive metal film has a ridge.

19. The system as recited in claim 14, wherein the conductive metal film has at least one of a C aperture formed therein, and an E shape.

20. The system as recited in claim 14, wherein a composition of the active region of the conductive metal film is different than the outer regions.

21. The system as recited in claim 14, wherein the main pole has a step extending towards the outer regions in an in-track direction, the outer regions extending along the step.

22. The system as recited in claim 14, wherein a light guiding core layer of the optical waveguide is spaced from the near field transducer by less than about 20 nanometers and greater than 0 nanometers.

23. The system as recited in claim 14, further comprising a secondary heat sink layer positioned between the main pole of the write portion and the outer regions, wherein a height of the outer regions is greater than a height of the active region, wherein a height of portions of the secondary heat sink layer extending along the outer regions is greater than a height of the secondary heat sink layer adjacent the active region, the heights being measured in a direction perpendicular to a media facing side of the conductive metal film.

24. A magnetic data storage system, comprising:
at least one magnetic head as recited in claim 14;
a magnetic medium;
a drive mechanism for passing the magnetic medium over the at least one magnetic head; and
a controller electrically coupled to the at least one magnetic head for controlling operation of the at least one magnetic head.

* * * * *